(12) United States Patent
Hessbrüggen et al.

(10) Patent No.: US 7,784,162 B2
(45) Date of Patent: Aug. 31, 2010

(54) ROTATING TOOL MAGAZINE HAVING AN END-MOUNTED ROTATIONALLY DRIVEN TOOL

(75) Inventors: Norbert Hessbrüggen, Salac (DE); Markus Hessbrüggen, Göppingen (DE)

(73) Assignee: Emag Holding GmbH, Salach (DE)

( * ) Notice: Subject to any disclaimer, the term of this patent is extended or adjusted under 35 U.S.C. 154(b) by 172 days.

(21) Appl. No.: 11/885,679

(22) PCT Filed: Feb. 7, 2006

(86) PCT No.: PCT/DE2006/000195

§ 371 (c)(1),
(2), (4) Date: Sep. 4, 2007

(87) PCT Pub. No.: WO2006/092110

PCT Pub. Date: Sep. 8, 2006

(65) Prior Publication Data

US 2008/0141837 A1    Jun. 19, 2008

(30) Foreign Application Priority Data

Mar. 1, 2005   (DE)   .................. 10 2005 009 893

(51) Int. Cl.
*B23B 3/00*   (2006.01)
*B23B 27/00*  (2006.01)

(52) U.S. Cl. ......................... 29/27 C; 82/121

(58) Field of Classification Search .................. 82/120, 82/121, 129, 157, 158; 29/50, 40, 35.5, 27 C
See application file for complete search history.

(56) References Cited

U.S. PATENT DOCUMENTS

| | | | |
|---|---|---|---|
| 5,020,201 A * | 6/1991 | Kitamura | 29/27 C |
| 5,125,142 A | 6/1992 | Kosho et al. | |
| 6,079,090 A * | 6/2000 | Ongaro | 29/27 C |
| 6,257,109 B1 * | 7/2001 | Shinohara et al. | 82/1.11 |
| 6,276,035 B1 | 8/2001 | Hessbrüggen et al. | |
| 7,089,836 B2 * | 8/2006 | Kato et al. | 82/1.11 |
| 7,204,004 B2 * | 4/2007 | Hashimoto et al. | 29/27 C |
| 7,240,411 B2 * | 7/2007 | Matsumoto et al. | 29/27 C |
| 7,266,871 B2 * | 9/2007 | Takeuchi et al. | 29/27 C |
| 7,395,589 B1 * | 7/2008 | Kuo | 29/40 |
| 7,506,424 B2 * | 3/2009 | Neo et al. | 29/40 |
| 2002/0170397 A1 | 11/2002 | Sauter et al. | |
| 2005/0160887 A1 * | 7/2005 | Erickson | 82/121 |
| 2005/0166728 A1 * | 8/2005 | Kato | 82/142 |

FOREIGN PATENT DOCUMENTS

| | | |
|---|---|---|
| DE | 3202042 | 8/1983 |
| DE | 3702424 | 8/1988 |

(Continued)

*Primary Examiner*—Will Fridie, Jr.
(74) *Attorney, Agent, or Firm*—Andrew Wilford

(57) ABSTRACT

The invention relates to a tool revolver (10, 11) with: a rotationally mounted tool carrier (6) that can be pivoted into the respective working position for a tool by means of a pivot drive; fixed tools (14), and; at least one rotationally drivable tool (15, 16). Particular advantageous result due to the fact that the rotationally drivable tool (15, 16) is mounted on the front face of the tool carrier (6). The invention also relates to a machine tool (1) equipped with a tool revolver (10, 11) of the aforementioned type.

6 Claims, 3 Drawing Sheets

FOREIGN PATENT DOCUMENTS

| | | |
|---|---|---|
| DE | 4308419 | 9/1994 |
| DE | 19621356 | 12/1997 |
| DE | 298 07 842 U1 | 9/1998 |
| DE | 19919553 | 11/2000 |
| EP | 1 291 101 A2 | 9/2002 |

\* cited by examiner

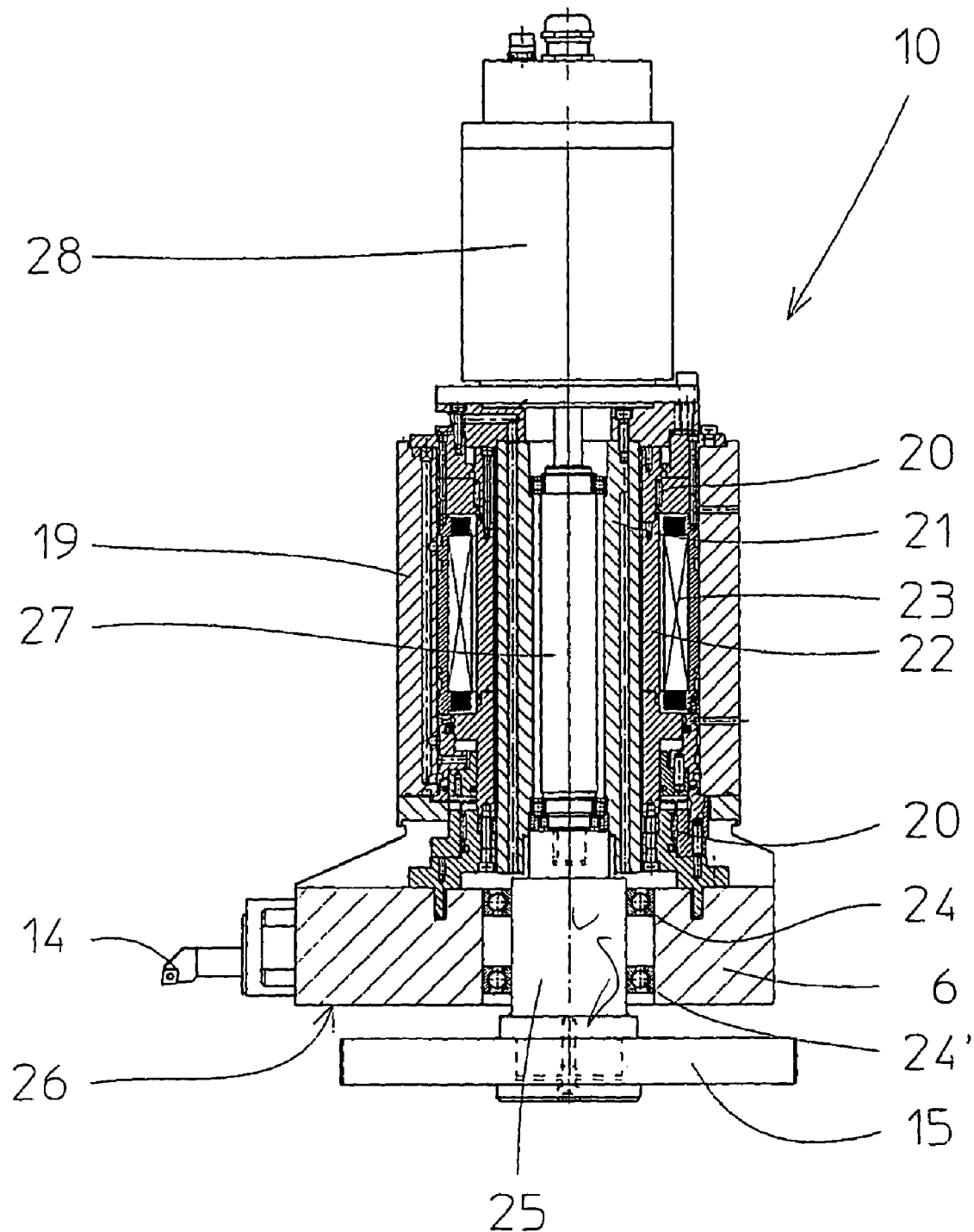

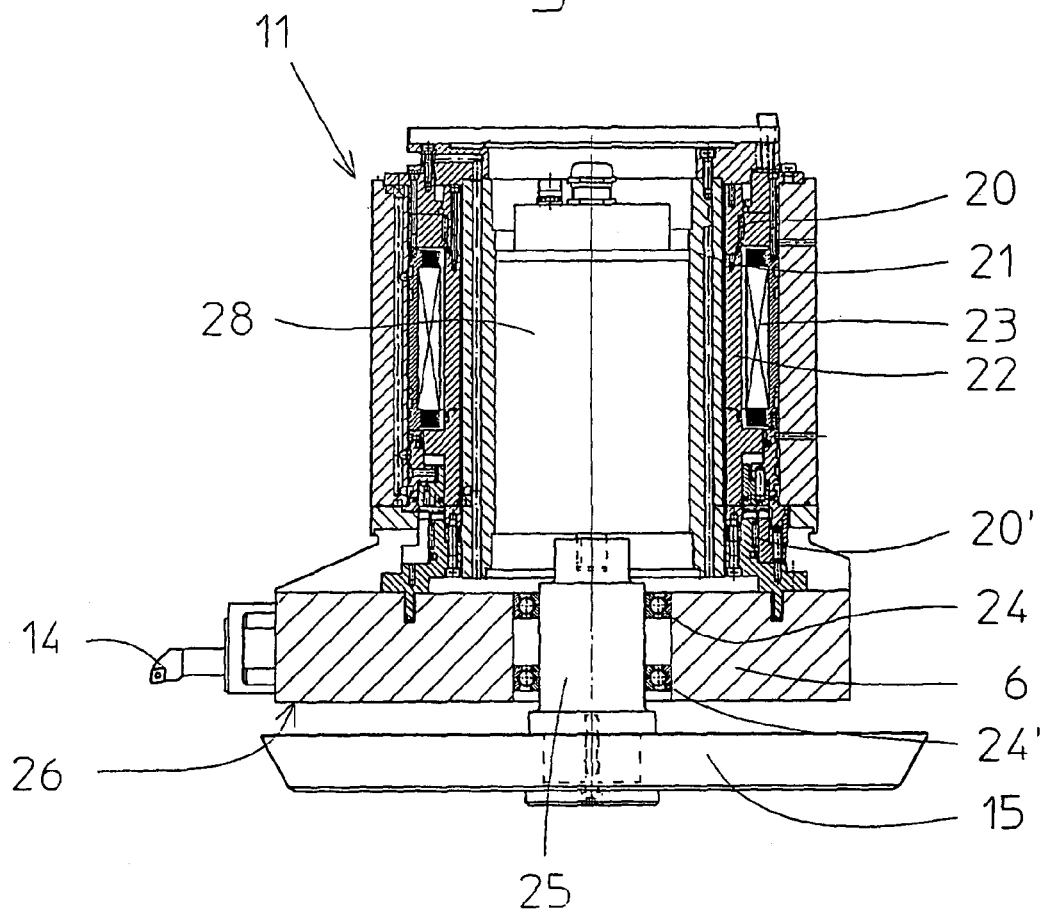

ROTATING TOOL MAGAZINE HAVING AN END-MOUNTED ROTATIONALLY DRIVEN TOOL

CROSS REFERENCE TO RELATED APPLICATIONS

This application is the US national phase of PCT application PCT/DE2006/000195, filed 7 Feb. 2006, published 8 Sep. 2006 as WO 2006/092110, and claiming the priority of German patent application 102005009893.2 itself filed 1 Mar. 2005, whose entire disclosures are herewith incorporated by reference.

FIELD OF THE INVENTION

The invention relates to a rotating tool magazine for a machining apparatus having at least one tool that can be driven by a motor and relates to a machining apparatus equipped with such a rotating tool magazine.

SUMMARY OF THE INVENTION

A rotating tool magazine with cutting tools for turning and tools that can be driven for boring or grinding is known from DE 298 07 842 U1. A rotating tool magazine having a direct drive for pivoting is known from DE 199 19 553 (U.S. Pat. No. 6,276,035)]. For both rotating tool magazines, the tools are mounted in a revolver disk. The driven tools are driven via an right-angle drive extending through the revolver disk. Due to the limited space, the maximum drive power for the tools, and thus also the size of grinding tools that can be used, are clearly limited.

OBJECT OF THE INVENTION

The object is therefore to fashion a machining apparatus with a rotating tool magazine such that the drive for the tools can be created, with a reduced space requirement, in a cost-effective and simple manner.

SUMMARY OF THE INVENTION

This object is attained with a rotating tool magazine wherein the rotatably driven tool is mounted on the end of the tool holder and using a machining apparatus that is equipped with such a rotating tool magazine.

The basic idea behind the invention is comprised in mounting the driven tool on the end of the tool holder. Thus the drive can extend through the tool holder without deflection or intermediate mechanical members such as e.g. an angle transmission, and the limited amount of space on the tool holder is no longer a factor in the design of the drive. In addition, the driven tool is not carried along during the pivot movement of the tool holder. This permits greater acceleration when the tool is replaced and decreases the amount of time necessary for machining a workpiece. In one advantageous embodiment, the tool holder is angularly fixed to a tube shaft. The spindle for the tool drive is mounted inside the tube shaft. At its outer side, the tube shaft is surrounded by a ring motor to the drive for the pivot movements of the tool holder. In another embodiment, the interior diameter of the tube shaft is selected such that the drive motor for the tool can be mounted inside the tube shaft.

BRIEF DESCRIPTION OF THE DRAWING

The invention is explained in greater detail in the following with reference to the illustrated embodiments.

FIG. 2 shows a rotating tool magazine, partially in section;

FIG. 3 shows a rotating tool magazine having a drive motor mounted in the tube shaft, partially in section.

SPECIFIC DESCRIPTION

Figure 1:
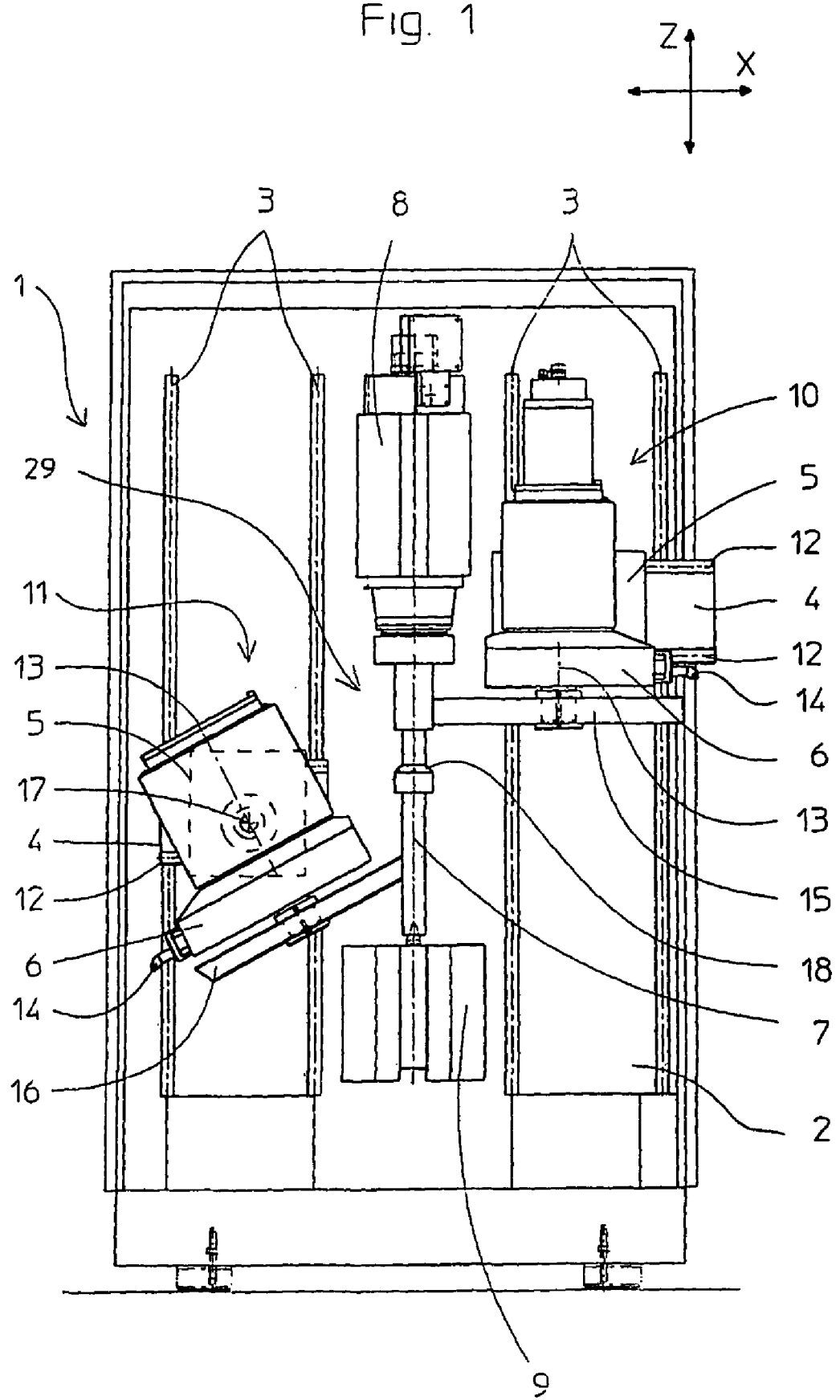
FIG. 1 shows a machining apparatus with two rotating tool magazines.

FIG. 1 shows a machining apparatus 1 and does not show details of the workpiece feed, drive, control, or housing that are not essential to the invention. The described machining apparatus 1 is suitable in particular for machining elongated workpieces 7. The latter are clamped in and rotated by the workpiece holding device 29 comprising a headstock 8 and a tailstock 9. The two rotating tool magazines 10 and 11 are movably guided on the machine frame 2 in two mutually orthogonal directions (X- and Z-axes). To this end, vertical guides 3 are provided on a machine frame 2 for two vertical slides 4 in turn carrying two guides 12 for respective horizontal slides 5. Respective tool holders 6 are rotatable about respective pivot axes 13 on the horizontal slides 5. The tool holders 6 hold stationary tools 14, in particular for turning. Driven tools 15 and 16 are mounted on the ends of the tool holders 6. The tool 16 is a conical grinding wheel. The rotating tool magazine 11 can pivot about an axis 17 so that the spindle of the tool 16 can be appropriately inclined at the cone apex angle with respect to the workpiece 7. Even conical surfaces 18 on the workpiece 8 can be machined with this arrangement.

FIG. 2 shows the rotating tool magazine 10, in partial section. Its housing 19 can be mounted fixed on the machine, or, as shown in FIG. 1, on a slide 5. Its tube shaft 21 is supported in the housing 19 by bearings 20 and 20'. A rotor 22 made up of an array of magnets is mounted outside. A stator 23 formed of electrical windings is juxtaposed therewith in the housing 19. The tool holder 6 is screwed securely to the tube shaft 21. Rotor 22 and stator 23 together form a ring motor that acts as the drive for rotating the tool holder 6. The tool holder 6 is a disk that carries the tools 14 on its outer edge, in particular for turning. Bearings 24 and 24' for a spindle 25 of the driven tool 15 are in the center of the tool holder 6. The tool 15 is mounted on the end of the tool holder 6. The spindle 25 is connected directly to the motor 28 by a shaft extending through the tube shaft 21. In this arrangement, the limited space in the tool holder 6 no longer has any effect on the design of the drive. In addition, the driven tool 15 is not moved by the rotation of the tool holder 6. This permits higher accelerations during tool changes and makes possible shorter cycles for machining workpieces 7.

In the embodiment in accordance with FIG. 3, the inside diameter of the tube shaft 21 is dimensioned such that the motor 28 for driving the tool 16 is located inside the tube shaft 21. In this space-saving arrangement, the spindle 25 for the tool 15 is connected directly to the motor 28. The housing 19, tool holder 6, and pivot drive with ring motor are mounted as described with reference to the embodiment in accordance with FIG. 2.

The invention claimed is:

1. In combination with a lathe having a frame and means for rotating a workpiece about a workpiece axis relative to the frame, a rotating tool magazine having a tool holder shiftable on the frame parallel and transversely to the workpiece axis and rotatable about a tool axis;

a pivot drive for pivoting the tool holder about the tool axis through a plurality of angularly offset work positions;

respective fixed tools on the holder offset from the tool axis and each engageable with the workpiece in a respective one of the work positions; and at least one driven tool mounted centrally on an end of the tool holder and also rotatable about the tool axis; and a motor carried on the tool holder for rotating the driven tool about the tool axis.

2. The combination in accordance with claim 1 wherein the tool holder is rotationally fixed to a tube shaft and is rotatably supported connected thereby to the pivot drive.

3. The combination in accordance with claim 1 wherein the driven tool is a grinding tool.

4. A lathe comprising:

a frame;

means on the frame for rotating a workpiece about a workpiece axis;

a tool support having a tube shaft centered on and pivotal on the frame adjacent the workpiece about a support axis;

a disk carried on and rotatable about the support axis with the tube shaft;

a plurality of nondriven tools carried on the disk and spaced angularly around a tool axis;

a ring motor surrounding the tube shaft for rotating the tool support about the tool axis through a plurality of positions in each of which a respective one of the nondriven tools is engageable with the workpiece;

a driven tool lying on and rotatable about the tool axis, on one axial side of the disk, and centered on the tool support; and a drive motor on an opposite axial side of the disk from the driven tool, mounted on the tool holder and having an output shaft extending axially inside the tube shaft and connected to the driven tool for rotating same about the tool axis.

5. The lathe defined in claim 4 wherein the nondriven tools are lathe bits.

6. The lathe defined in claim 4 wherein the driven tool is a grinding wheel.

* * * * *